June 13, 1961     F. J. HOOVEN     2,988,160
VEHICLE REAR AXLE GUIDING SYSTEM
Filed Dec. 29, 1955     2 Sheets-Sheet 1
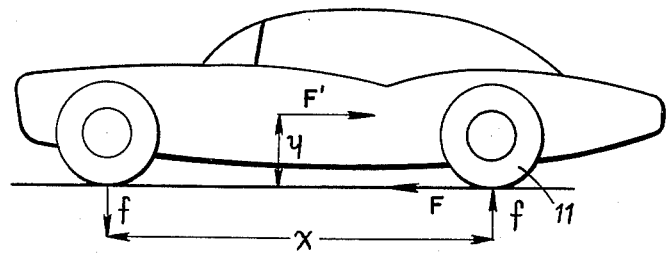
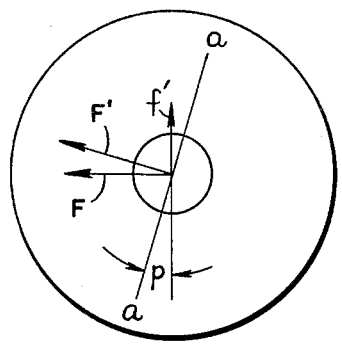
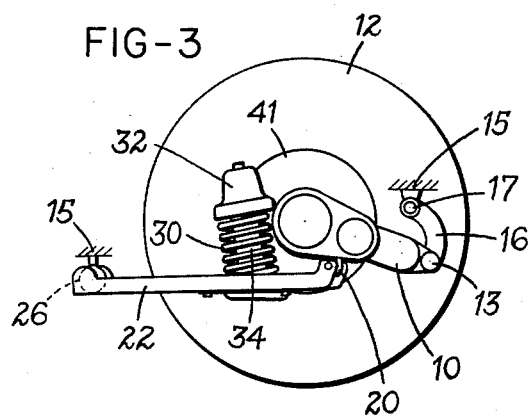
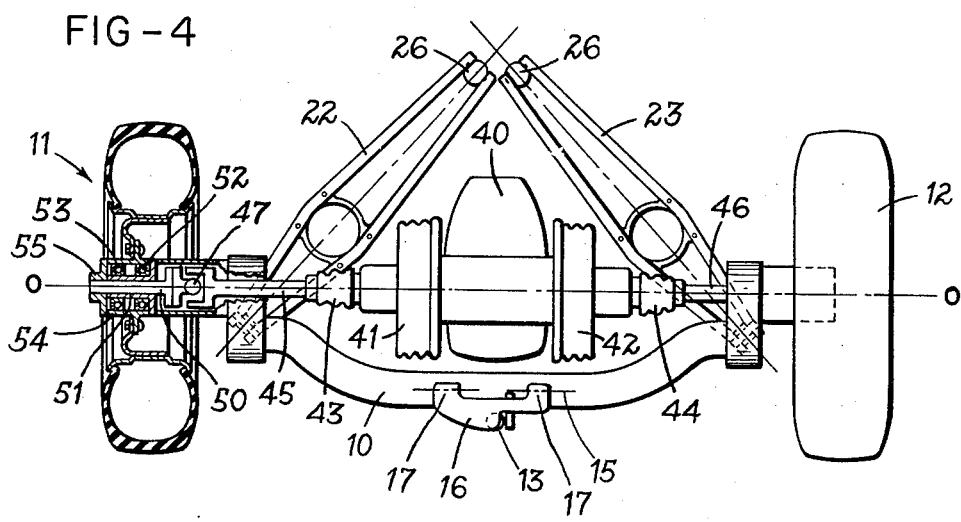
INVENTOR.
FREDERICK J. HOOVEN
BY
Marechal, Biebel, French & Bugg
ATTORNEYS June 13, 1961 F. J. HOOVEN 2,988,160
VEHICLE REAR AXLE GUIDING SYSTEM
Filed Dec. 29, 1955 2 Sheets-Sheet 2
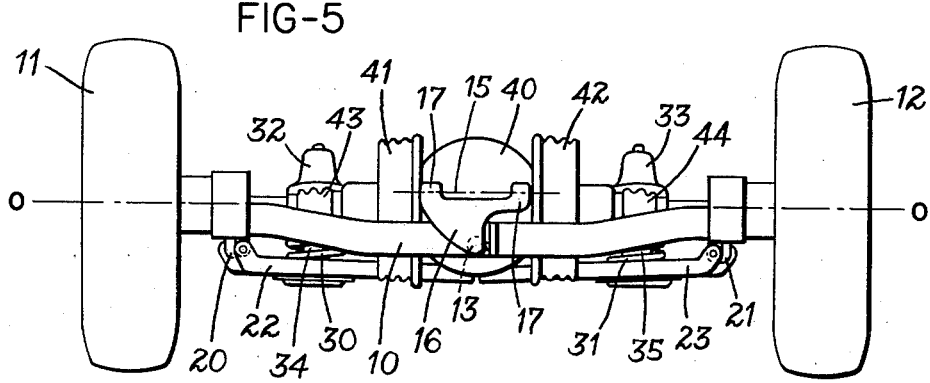
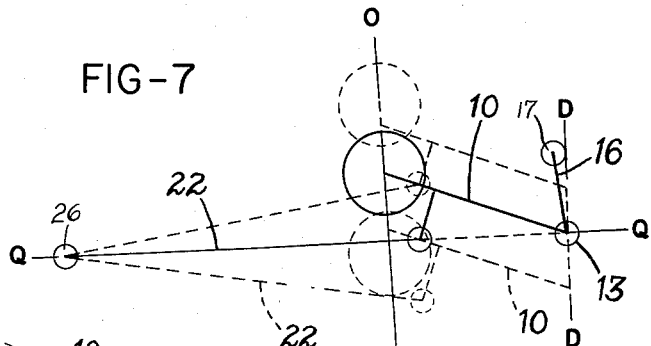
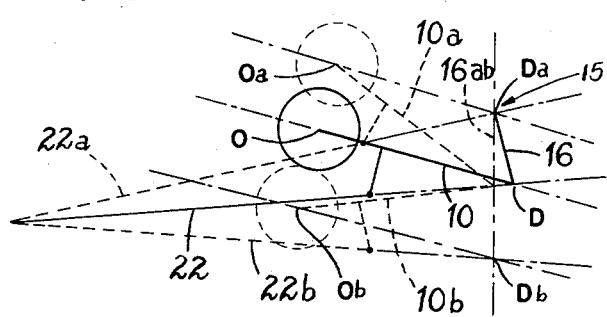
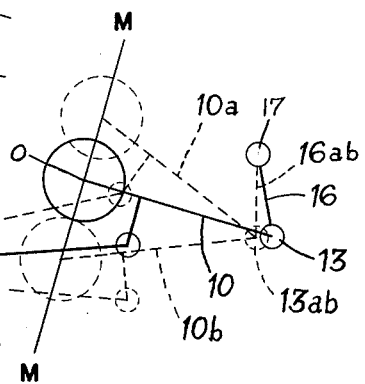
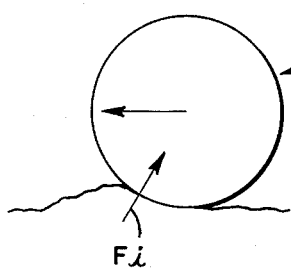
*INVENTOR.*
FREDERICK J. HOOVEN
BY
Marechal, Biebel, French & Bugg
ATTORNEYS

2,988,160
VEHICLE REAR AXLE GUIDING SYSTEM
Frederick J. Hooven, 647 Woods Road, Dayton 9, Ohio
Filed Dec. 29, 1955, Ser. No. 556,179
13 Claims. (Cl. 180—73)

This invention relates to a rear axle system, and particularly to such a system for use with passenger cars.

The conventional rear axle consists of a solid structure between the wheels, carrying the brakes at its ends and the final drive gears and differential at its midpoint. The weight of this unit, with the wheels, usually will average about ten percent of the weight of the vehicle, and more than twenty percent of the weight carried on the rear wheels. It is generally agreed that this large unsprung mass is detrimental to the comfort and stability of the car on rough roads or at high speeds, since it tends to oscillate at such amplitudes as to cause the wheels to leave the ground momentarily, at which time they are useless for keeping the car on its course. Such a mass, flexibly mounted and subject to various combinations of forces and couples, will have a number of modes of resonant vibration both in translation and rotation which have a particularly violent effect on the car's behavior. The concentrated mass of the gear drive and differential unit at the center of the axle aggravates these oscillations because of its tendency to become a center of rotation when subjected to unbalanced forces, serving thus as an anvil whereby disturbances in the position of one wheel are caused to produce a disturbance of the other wheel, thereby inducing or exciting various modes of vibrations.

On the other hand, the large unsprung mass serves to improve the softness of riding at low speeds or on smoother roads (the "boulevard ride") because it forces the tires to absorb the smaller irregularities of the road without communicating so much motion to the axle. This type of ride is of great importance in the salability of a car, and cannot be materially sacrificed in order to improve comfort and safety under more severe conditions.

Various axle and suspension systems have been proposed in which the differential carrier and brakes are mounted on the frame of the car instead of the wheel, thereby removing the mass of these members from the unsprung mass and adding it to the sprung mass. In some of such systems the wheels are independently suspended, and in others they are mounted on a dead axle, the latter known as the De Dion system. The various advantages and disadvantages of such systems are known to those skilled in the art, and it is therefore unnecessary to repeat them here.

Axle deflections may be classified in two components, one being parallel deflection in which relative upward movements of one wheel is accompanied by equal upward movement of the other, with their common axis thereby remaining parallel to its normal position, and the other being roll deflection or angular deflection, in which relative upward movement of one wheel is accompanied by equal downward movement of the other. All such deflections are related to the vehicle frame as reference, with the frame regarded as stationary, and all references to positions are taken as the normally loaded operating positions unless otherwise noted.

A roll deflection generally accompanies a turn, due to the effect of centrifugal force on the mass of the vehicle, and during such roll deflection it is desirable from a standpoint of directional stability to introduce a condition known as roll understeer. This effect is a steering motion of the rear axle that is introduced by means of a degree of horizontal motion of the wheel as a component of vertical motion in roll deflection. To provide a stable condition it is desirable that a roll deflection shall induce a steering motion such as to oppose the turn which caused the roll, and this means that the upward moving wheel shall move forward relative to the downward moving wheel. Normally this requires that all upward wheel deflections be accompanied by a component of forward deflection, a condition which is not compatible with the maximum of comfort, which requires that the upward deflecting wheel move to the rear in order to cushion the rearward component of shock.

As spring suspensions become softer another element becomes important in the geometry of the rear suspension, and this is the vertical component of horizontal driving and braking forces. The tendency of the vehicle to assume a tail-down attitude under forward acceleration (known as "squat") and a nose-down attitude under braking (known as "dive") is greater as the springs become softer, and it becomes more important that the rear suspension be able to provide a counteracting force, especially in the case of squat, since all the driving force is applied by way of the rear wheels, while only a small proportion of the braking force is so applied.

Anti-squat requires that a forward horizontal force provide a vertical component tending to lift the car body, or more accurately, tending to cause a downward parallel deflection of the wheels. This in turn requires that upward deflection be accompanied by rearward motion, a condition already seen to be compatible with comfort but ordinarily incompatible with steering stability.

The present invention provides an axle system which overcomes the above listed difficulties. The term "axle system" as used herein refers to an axle with wheels as adapted to be used as a functioning part of a vehicle, taken together with the various elements by means of which the axle is movably related to the frame of the vehicle, and by means of which its various degrees of freedom relative to the vehicle frame are defined. As used herein the term "axle" is a non-rotating member on which wheels are rotatably mounted, as distinct from a live axle which rotates with the wheel.

The primary object of the present invention is to provide, in a rear axle system, for a rearward wheel motion to accompany upward motion in parallel deflection, while upward motion of a wheel in roll deflection is accompanied by a forward motion relative to the downward moving wheel.

Another object is to provide a rear axle system in which wheel motion in parallel deflection is at all times in a direction parallel to the plane of rotation of the wheel, under all conditions of superimposed roll deflection.

A further object is to provide a rear axle system in which motion in parallel deflection is at all times without any substantial steering angle change, under all conditions of superimposed roll deflection.

An additional object of this invention is to provide a rear axle system in which the degree of steering angle change with motion in roll deflection is substantially constant under all conditions of superimposed parallel deflection.

It is also the object of this invention to provide a rear axle system in which horizontal forces are accompanied by vertical components which tend to neutralize the pitching moments resulting from such forces, and which have constant relative values under all conditions of deflection.

Another object is to provide a rear axle system in which the elements comprise a straight-line linkage for guiding the wheels in parallel deflection.

A further object is to provide a rear axle system which occupies a minimum of useful space within the vehicle.

Other objects and advantages may be seen from the following description, the accompanying drawings and the appended claims.

In the drawings:

FIG. 1 is a force diagram showing the nature of squat and dive forces;

FIG. 2 is a force diagram showing the nature of anti-squat and anti-dive forces;

FIGS. 3, 4 and 5 are the side, top plan and rear elevations of an example of the present invention designed to form a part of a modern passenger vehicle;

FIG. 6 is a simplified diagram showing the side elevation of the system;

FIG. 7 is a view similar to FIG. 6 showing the same system under conditions of roll deflection;

FIG. 8 is a diagram similar to FIGS. 6 and 7 showing the location of the instantaneous center of rotation of the axle for various positions in parallel deflection; and FIG. 9 illustrates the condition of the force component when a wheel strikes an obstruction in the road.

Referring to the drawings, which illustrate a preferred embodiment of the invention, and particularly to FIG. 1, there is shown a force F, operating at the point of contact between the wheel and the road, tending to accelerate the vehicle. This is resisted by an equal and opposite force F' acting at the center of gravity of the car, which is $y$ above the road surface. There is thus a moment $Fy$ tending to rotate the vehicle in a clockwise direction. This is resisted by a moment $fx$, where $x$ is the wheelbase of the car and $f$ is an incremental vertical force exerted at each wheel, known as weight transfer, and which under the conditions shown augments the vertical force on the rear wheels and diminishes that at the front, thus resulting in squat.

From FIG. 2, where the instantaneous path of the wheel axis is along the line $a$—$a$, it may be seen that the resultant force transmitted to the car structure from the wheel must be normal to the line of travel. This is on the assumption that vertical forces are transmitted through springs and linkages which are without static friction, and that the spring rate is low enough so that its force may be regarded as constant over a small increment of travel. A horizontal force F will then be seen to have a normal resultant of F' and a vertical force of $f'$ will appear as a component, where $f'$ is F tan $p$, $p$ being equal to the angle between the line $a$—$a$ and the vertical. When $a$—$a$ slants to the rear as it rises, $f'$ will be a lifting force exerted on the frame by the axle when F is a forward acting force, so that under this condition there will be both anti-squat and anti-dive.

FIGS. 3, 4 and 5 show an axle 10 carrying wheels 11 and 12 on the common wheel axis O—O. A center joint 13 is attached to axle 10 near the center line of the vehicle frame. The frame is indicated schematically at 15 at points of attachment to the axle system. Connected to axle 10 by joint 13 is a shackle or link 16 which carries bushings 17, by means of which it is pivotally attached to the vehicle frame, and providing a carrying means for the axle. Side bearings 20 and 21 are attached to axle 10, and to these side bearings are attached radius arms 22 and 23. These arms are supported in converging relation to each other and are joined to the vehicle frame by means of joints 26, with the convergence of the radius arm centerlines meeting at the vehicle center line. Coil springs 30 and 31 bear against arms 22 and 23, and are supported against brackets 32 and 33, which are joined to the vehicle frame. Hydraulic dampers 34 and 35 are mounted concentrically within the coil springs. The springs and dampers shown form a convenient means of providing the requisite compliant suspension for the system, but other compliant means may be similarly applied, such as air or hydraulic cylinders together with other types of spring.

Differential carrier 40 is mounted to the frame of the car, and while it and its associated parts for driving the wheels form no part of this invention, they are shown and noted in order that it may be seen how these parts are adapted to the overall design of the rear axle system. Brake drums 41 and 42 are attached to the side shafts (not shown) of the differential gearing, and to which are also attached the universal joints 43 and 44, to which are attached drive shafts 45 and 46. Connected to shaft 45 is a universal joint 47 which is mounted on a flanged axle shaft 50 running within a hollow spindle 51, which is mounted on the structure of axle 10, and on which spindle run ball bearings 52 and 53. On these bearings is carried a hub 54 driven from shaft 50 through a flanged coupling 55, and which carries wheel 11.

FIG. 6 shows the system in side elevation in diagrammatic form, illustrating the conditions which obtain under parallel deflection. It will be noted that the arrangeent and relative dimensions of the arm 22, the axle 10 and the shackle 16 are such that the wheel axis O moves in a straight line, M—M. It will be noted that this line is normal to a line drawn through the wheel axis and joint 13. Joint 13 being behind and below the wheel axis, it will be noted that the line M—M slopes rearward and upward, so that as the wheel axis moves from its normal position O to its upward deflected position of O$a$ it also moves toward the rear. Likewise in moving downward to its lower position O$b$ the wheel axis moves forward.

Referring to FIG. 8, in which are shown the locations of the instantaneous center of rotation of the axle for various positions in parallel deflection, points 26 and 15 are shown in the side elevation (FIG. 3) as the two fixed points, being the points of attachment to the vehicle frame. The point O is the wheel center, normal position, and the points O$a$ and O$b$ indicate typical upward and downward deflected positions of point O, with similar subscripts denoting the corresponding deflected positions of the various other elements.

The axle system in side elevation resembles a simple linkage having two links 22 (the radius arm) and 16 (the shackle) swinging about the fixed centers 26 and 15, and having the free ends 20 and 13 connected by a third link 10 (the axle) which also carries the point O. Consequently the instantaneous center of rotation is at the intersection of the extended lines of the two links 22 and 16, giving the various instantaneous centers shown at D, D$a$ and D$b$.

Thus, the shackle 16 assumes the position 16$ab$ for either of the deflected positions shown, while the arm 22 assumes the positions 22$a$ and 22$b$. The intersection of the extended lines of 22$a$ and 16$ab$ provides the position D$a$ of the deflection axis, while the intersection of 22$b$ and 16$ab$ provides the point D$b$. The undeflected or normal position of the deflection axis D corresponds to joint 13.

Since the motion of point O is in a straight line, the lines O$a$, D$a$ and O$b$, D$b$ are almost exactly parallel to the line OD, as shown in FIG. 8. Accordingly, the plane containing the wheel axis and the instantaneous deflection axis is maintained at a substantially constant angle with respect to the vehicle frame, and the deflection axis, extending between points D at opposite sides of the system, remains below and rearwardly of wheel axis O—O under all conditions of parallel deflection, with or without superimposed roll deflection, and also is maintained parallel to the wheel axis.

FIG. 7 shows the system in side elevation in diagrammatic form, illustrating the relative motion of the system during pure roll deflection, without any movement in parallel deflection. For the purposes of explanation it will be assumed that the vehicle is making a turn to the left, and therefore that the right wheel 12 is moving upwardly toward the frame and the left wheel 11 is moving downwardly away from the frame, due to the centrifugal forces exerted on the frame. The roll axis is represented by the line Q—Q drawn through the joint 13, and the point of intersection of the radius arm center lines, which is located just forwardly of joints 26, and may be considered as coincident with these joints since they are located as close as possible to the point of intersection in a practical application, and may even possibly be made as one joint located exactly at the point of intersection if practical conditions permit. Since the point of intersection is lower than joint 13 the roll axis is inclined forwardly and downwardly with respect to the vehicle frame and intersects the ground at a point forward of the wheel axis O—O. Accordingly, in roll deflection the whole system rotates about the roll axis without any relative motion of its principal geometrical parts.

Considering then the conditions illustrated in FIG. 7, radius arm 23 is moved upwardly and arm 22 is moved downwardly with respect to the normal position of the arms, shown by arm 22 in full lines. Since the roll axis Q—Q is inclined as above described the side bearing 21 will be drawn forwardly with respect to side bearing 20, and the deflection axis D—D (and the axle 10) will be guided in roll movement about the joint 13, with the wheel axis O—O being shifted to guide the upwardly moving wheel 12 forwardly with respect to the downwardly moving wheel 11. This follows since roll deflection, as defined, is an equally opposite deflection of the two wheel centers, and constitutes in conjunction with the above noted motion in parallel deflection the realization of the primary object of the invention.

Since, as noted above, roll deflection is accomplished by a simple rotation of the complete system about the roll axis Q—Q without any relative motion of the geometrical elements, it follows that the operation of the system in parallel deflection is unaffected by superimposed roll deflection within the limits of travel of the springs and shock absorbers, and therefore no substantial lateral motion of the wheels nor steering angle change will accompany motion in parallel deflection even when it is superimposed on an existing roll deflection.

Furthermore, if there is no change of steering angle with motion in parallel deflection and superimposed roll deflection, then it must follow that motion in roll deflection must accomplish substantially the same steering angle change regardless of the amount of superimposed parallel deflection.

Referring again to FIG. 2, in connection with which it was shown that the anti-squat and anti-dive forces are proportional to the tangent of the angle of the instantaneous path of the wheel axis in parallel deflection, it may be seen from FIG. 6 that since the angle of the path of the wheel center in the present system is constant from the top to the bottom of its range of travel, illustrated by the line M—M in FIG. 6, then the proportion of vertical components to horizontal forces will remain constant for all values of deflection. Since parallel deflection does take place in a straight line, it follows that parallel deflection is true translatory motion of the wheel axis. The realization of another object may be seen from direct inspection of FIG. 4 from which the action of the elements of the system may be seen as a true straight-line linkage.

FIGS. 3, 4 and 5 show that since the center portion of axle 10 partakes of almost no vertical motion, while the associated driving parts are mounted on the frame of the car instead of the axle, it is possible to build the floor of the vehicle, for example the luggage compartment, no higher than the tops of the brake drums 41 and 42. Without the necessity for clearance space to permit the vertical movement of the axle system parts, a minimum of space within the vehicle is occupied by the axle system.

A very common defect of existing types of suspension is that lateral motion and steering motions both take place with motion in parallel deflection with superimposed roll deflection. For example, on a rough road while rounding a curve the driver of the vehicle will experience the necessity to correct the steering constantly as the suspension deflects with road irregularity, and the safe speed will be limited by a tendency of the rear wheels to lose their adhesion and allow the rear of the car to slip toward the outside of the curve. These defects are overcome by the present invention.

It has been shown that the rearward motion of the wheel with upward deflection results in anti-squat and anti-dive forces, and FIG. 9 shows the condition of the wheel on striking an obstacle in the road, in which the component forces $F_i$ of the impact is seen to slope rearwardly through the wheel center, so that the rearward slope of the path of the wheel center in upward deflection also provides an appreciable improvement in the smoothness of riding. In commonly used systems neither of these advantages can be realized because of the fact that such motion also involves rearward motion of the wheel in roll deflection, with attendant oversteer.

Because of the straight-line path of the wheel axis in parallel deflection, it may be seen that this condition applies equally to all degrees of deflection, so that the vehicle may be heavily or lightly loaded with equal degree of advantage from this slope. It may also be noted that the degree of slope may be controlled by the designer by controlling the position of the joint 13 and the plane which includes joints 13 and 26 and bearings 20 and 21.

The straight line motion may be maintained in the face of changes in the relative lengths of the various elements of the system by changing of the angle of the shackle 16.

While the form of apparatus herein described constitutes a preferred embodiment of the present invention, it is to be understood that the invention is not limited to this precise form of apparatus, and that changes may be made therein without departing from the scope of the invention which is defined in the appended claims.

What is claimed is:

1. An axle system kinematically related to a vehicle frame comprising an axle supporting wheels on a common wheel axis, means including a link pivotally connected at one end to said axle defining a deflection axis located in a plane passing through said wheel axis and intersecting the ground to the rear of said wheel axis, means including said pivot connection between said link and said axle defining a roll axis extending along the central longitudinal plane of the frame and intersecting the ground forward of said wheel axis, means including said link and radius arm means pivotally connected to said axle and pivotally connected to said frame forwardly and below said wheel axis guiding said wheel axis in parallel deflection along a plane extending substantially normal to said plane containing said wheel axis and said deflection axis, and means including a pivotal connection between said link and said frame for maintaining said wheel axis and said deflection axis parallel to each other during movement thereof in roll about said roll axis to provide a controlled understeering condition in roll deflection independent of wheel axis movements in parallel deflection.

2. In an axle system kinematically related to a vehicle frame the combination of an axle supporting wheels on a common wheel axis, means including a link pivotally connected at one end to said axle defining a roll axis extending along the central longitudinal plane of the frame and intersecting the ground forwardly of said wheel axis, means including said link and radius arm means pivotally connected to said axle and pivotally connected to said frame forwardly and below said wheel axis maintaining movement of said wheel axis in parallel deflection in a plane intersecting the ground between said wheel axis and the intersection of said roll axis and the ground, and means including said pivotal connection between said axle and said link and said pivotal connection between said radius arm means and said frame providing for rotation of the plane of movement of said wheel axis about said roll axis during roll movement of said axle about said roll axis to move the upwardly deflecting wheel in a forward direction with respect to the wheel moving downwardly for inducing a controlled understeering motion in said system during movements in roll deflection without affecting the planar movement of said wheel axis under conditions of parallel deflection.

3. In an axle system kinematically related to a vehicle frame the combination of means for supporting wheels on a common wheel axis, means carrying said wheel supporting means in pivotal relation with respect to the frame, means defining a roll axis extending along the central longitudinal plane of the frame and intersecting the ground forward of said wheel axis including bearing means located on said carrying means at said roll axis providing for movement of said wheel supporting means and said wheel axis in roll about said roll axis, and radius arms each pivotally connected adjacent one end thereof to said wheel supporting means and extending in converging relation toward a point on said roll axis spaced from the intersection thereof with said carrying means, said radius arms having a pivotal connection adjacent their other ends attached to the frame adjacent said point of convergence between said arms and said roll axis.

4. In an axle system kinematically related to a vehicle frame, the combination of a rigid axle carrying wheels on a common wheel axis, bearing means fixed to said axle defining a deflection axis parallel to the wheel axis located in a plane passing through said wheel axis intersecting the ground to the rear of said wheel axis, means mounting said bearing means on the frame to define a roll axis contained in a plane perpendicular to said deflection axis and substantially centrally of the frame, said bearing means being arranged to maintain said roll axis at a substantially constant angle with respect to the horizontal, means on said axle connected to said bearing means for guiding movement of said deflection axis in roll about said roll axis while allowing translation thereof, and radius arms extending in diverging relation to each other between fixed pivot points on the frame and said axle defining the fore and aft positions of said deflection axis, said radius arms being located along lines intersecting said roll axis at a point thereon spaced from said bearing means and being operable in combination with said bearing mounting means to maintain said wheel axis parallel to said deflection axis during movement thereof about said roll axis.

5. In an axle system kinematically related to a vehicle frame the combination of a rigid axle carrying wheels on a common wheel axis, bearing means on said axle defining a deflection axis parallel to said wheel axis located in a plane passing through said wheel axis intersecting the ground to the rear of said wheel axis, means mounting said bearing means on the frame defining a roll axis sloping downwardly to intersect the ground at a point forward of said wheel axis and contained in a vertical plane substantially centrally of the frame, means on said axle connected to said bearing means for guiding movement of said deflection axis in roll about said roll axis while allowing translation thereof, radius arms operable between fixed pivot points on the frame and said axle defining the fore and aft positions of said deflection axis, said radius arms extending in converging relation with respect to each other from said axle toward a point on said roll axis spaced from said bearing means and having said fixed points thereon located adjacent said point of convergence between said arms and said roll axis, and said radius arms being operable in combination with said bearing mounting means to maintain said wheel axis parallel to said deflection axis during movement thereof about said roll axis.

6. In an axle system kinematically related to a vehicle frame the combination of a rigid axle supporting wheels on a common wheel axis, means carrying said wheel axis in pivotal relation with respect to the frame, means defining a roll axis extending along the central longitudinal plane of the frame and intersecting the ground forwardly of said wheel axis including bearing means on said carrying means located at said roll axis providing for movement of said axle and said wheel axis in roll about said roll axis, means including a link extending from said bearing means to said frame defining a deflection axis parallel to said wheel axis and located in a plane passing through said wheel axis and intersecting the ground to the rear of said wheel axis, and radius arm means pivotally attached to said frame and to said axle maintaining movement of said wheel axis in parallel deflection along a plane extending substantially perpendicular to said plane containing said wheel axis and said deflection axis.

7. In an axle system kinematically related to a vehicle frame, the combination of an axle carrying wheels on a common wheel axis, means defining a roll axis in the central longitudinal plane of the frame including a joint attached to said axle behind and below said wheel axis and bearing means located on said frame forward of said axle and below said joint, said joint also being attached to a shackle pivotally connected to said frame, said joint being located in a deflection axis parallel to and below and behind said wheel axis, means including a pair of radius arms pivotally connected to said axle and pivotally connected to said bearing means on the frame for confining translatory motion of said wheel axis to a plane passing through the normal position of said wheel axis intersecting the ground forward thereof while confining angular motion of said wheel axis to a roll about said roll axis.

8. In an axle system kinematically related to a vehicle frame the combination of an axle supporting wheels on a common wheel axis, means carrying said wheel axis in pivotal relation with respect to the frame, means defining a roll axis extending along the central longitudinal plane of the frame and intersecting the ground forwardly of said wheel axis including bearing means on said carrying means located at said roll axis providing for movement of said axle and said wheel axis in roll about said roll axis, means including a link extending from said bearing means to said frame defining a deflection axis parallel to said wheel axis and located in a plane passing through said wheel axis and intersecting the ground to the rear of said wheel axis, radius arm means pivotally attached to said frame and to said axle maintaining movement of said wheel axis in parallel deflection along a plane extending substantially perpendicular to said plane containing said wheel axis and said deflection axis, and compliant means extending between said system and the frame for maintaining parts of said system in predetermined spatial relation with respect to the frame.

9. In an axle system kinematically related to a vehicle frame the combination of an axle carrying wheels on a common wheel axis, bearing means fixed to said axle behind and below said wheel axis defining a deflection axis parallel to said wheel axis located in a plane passing through said wheel axis intersecting the ground to the rear of said wheel axis, means mounting said bearing means on said frame defining a roll axis sloping downwardly to intersect the ground at a point forward of said wheel axis and contained in a vertical plane substantially centrally of the frame, means on said axle connected to said bearing means for guiding movement of said deflection axis in roll about said roll axis while allowing translation thereof, radius arms pivotally connected to fixed points on the frame and said axle defining the fore and aft positions of said deflection axis, said radius arms extending in converging relation with respect to each other from said axle toward a point on said roll axis spaced from said bearing means and having said fixed points thereon located adjacent said point of convergence between said arms and said roll axis, said radius arms being operable in combination with said bearing mounting means to maintain said wheel axis parallel to said deflection axis during movement thereof about said roll axis, and compliant means acting between said radius arms and the frame tending to maintain a predetermined spatial relation between said wheel supporting means and the frame.

10. In an axle system kinematically related to a vehicle frame, a rigid axle carrying wheels on a common wheel axis, a joint attached to said axle at a point midway between said wheels and below and behind said wheel axis, a shackle connected to said joint, said shackle being pivotally connected to said frame along an axis above and forward of said joint, means defining a roll axis passing through said joint to intersect the ground forward of said wheel axis including bearing means on said frame forward of said wheel axis, means defining pivot points attached to said axle near said wheels along an axis parallel to and behind said wheel axis and in a plane passing through said joint and said bearing means, radius arms connected to said axle at said pivot points, said radius arms being pivotally connected to said bearing means mounted on said frame.

11. A rear axle system kinematically related to a vehicle frame comprising the combination of a rigid axle member and wheels supported at opposite ends thereof on a common wheel axis, means connecting said axle member to said frame including a joint attached to said axle behind and below said wheel axis, means having pivotal connections to said axle adjacent opposite ends thereof and also having pivotal connection to said frame forward of and below said wheel axis providing for controlled roll movement of said wheel axis, a link connected at one end to said joint and having at its other end a pivot connection with said frame, means including said link defining a deflection axis parallel to said wheel axis and located in a plane passing through said wheel axis and intersecting the ground to the rear of said wheel axis, said deflection axis defining means and said roll movement controlling means being correlated to prevent a steering movement of said wheel axis during primarily parallel deflection of said axle and to cause parallel deflection movement of said axle to occur in an upward and rearward direction with respect to said frame, and compliant means biasing said axle into normally spaced relation with respect to said frame.

12. A wheel suspension for a motor vehicle comprising a vehicle frame, a pair of road wheels on opposite sides of said frame, transversely extending driving means for said road wheels, a rigid transversely extending axle rearwardly of said driving means and interconnecting said wheels, a pair of generally longitudinally extending suspension arms each pivotally connected at one end to said frame and at the opposite end to said axle adjacent the outer ends of the latter, and a relatively short link having its opposite ends pivotally connected directly to said frame and to said axle adjacent the transverse midpoint of the axle, said link lying generally in a vertical plane through the longitudinal center line of the vehicle.

13. A wheel suspension for a motor vehicle comprising a vehicle frame, a pair of road wheels on opposite sides of said frame, a differential mechanism mounted upon said frame intermediate said wheels, driving shafts extending from said differential mechanism to said wheels for driving the latter, a rigid generally transversely extending axle interconnecting said wheels and radially spaced from said driving shafts, a relatively short link pivotally connected to said axle adjacent the longitudinal center line of the vehicle for pivotal movement with respect thereto about a transversely extending axis, said last mentioned pivotal connection being spaced beneath a horizontal plane through the axis of said road wheels, said link extending generally upwardly from its pivotal connection to said axle and having a pivotal connection with said frame, one of said pivotal connections being a universal connection accommodating rocking movement of said axle about a longitudinally extending axis as well as pivotal movement of said link about a transversely extending axis, and a pair of generally longitudinally extending suspension arms each pivotally connected at its forward end directly to said vehicle frame and pivotally connected at its rearward end directly to said axle intermediate said link and one of said road wheels, the pivotal connections between said suspension arms and said axle being located forwardly of the pivotal connections between said link and said frame.

References Cited in the file of this patent
UNITED STATES PATENTS

| | | |
|---|---|---|
| 2,369,501 | Wagner | Feb. 13, 1945 |
| 2,445,219 | Greaves | July 13, 1948 |
| 2,746,766 | Nallinger | May 22, 1956 |

FOREIGN PATENTS

| | | |
|---|---|---|
| 642,882 | Great Britain | Sept. 13, 1950 |